United States Patent
Niitsuma et al.

(10) Patent No.: US 7,465,383 B2
(45) Date of Patent: Dec. 16, 2008

(54) MASTER INFORMATION CARRIER FOR MAGNETIC TRANSFER AND ITS PRODUCTION METHOD

(75) Inventors: Kazuhiro Niitsuma, Odawara (JP); Masakazu Nishikawa, Odawara (JP); Tadashi Yasunaga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 786 days.

(21) Appl. No.: 11/103,605

(22) Filed: Apr. 12, 2005

(65) Prior Publication Data

US 2005/0181133 A1      Aug. 18, 2005

Related U.S. Application Data

(62) Division of application No. 10/791,384, filed on Mar. 3, 2004, now abandoned.

(30) Foreign Application Priority Data

| Mar. 4, 2003 | (JP) | ............... 2003-056814 |
| Mar. 4, 2003 | (JP) | ............... 2003-056815 |
| Jul. 8, 2003 | (JP) | ............... 2003-193508 |

(51) Int. Cl.
     *B29D 17/00*      (2006.01)

(52) U.S. Cl. ............................ 205/68; 205/67; 205/70; 428/848.3

(58) Field of Classification Search ............. 205/67–70; 428/848.3, 826; 430/320, 324
See application file for complete search history.

(56) References Cited

U.S. PATENT DOCUMENTS

| 5,756,130 | A | 5/1998 | Umebayashi et al. |
| 6,759,183 | B2 * | 7/2004 | Nagao et al. ................ 430/320 |
| 6,772,507 | B2 | 8/2004 | Aoki |
| 2001/0028964 | A1 | 10/2001 | Nagano et al. |
| 2004/0211752 | A1 | 10/2004 | Aoki |

FOREIGN PATENT DOCUMENTS

| JP | 6-333272 | 12/1994 |
| JP | 2002-92870 | 3/2002 |

* cited by examiner

*Primary Examiner*—Nam X Nguyen
*Assistant Examiner*—Luan V Van
(74) *Attorney, Agent, or Firm*—Sughrue Mion, PLLC

(57) ABSTRACT

A master information carrier for magnetic transfer includes a master substrate made of metal, including an embossed pattern corresponding to information to be transferred. The master substrate is produced by laminating a metal disk with a predetermined thickness on an original disk, on which an embossed pattern is formed, by electroforming, peeling off the metal disk and die-cutting a disk in a desired size. An outer diameter of the metal disk is at least 1.7 times longer than an outer diameter of the die-cut master substrate. When the metal disk is peeled off from the original disk, deformation due to the forces acting from the side of the outer circumference is reduced. The flatness of the metal disk is ensured and the transfer qualities are improved. Further, a step of removing distortion of the metal disk, caused at the time of peeling off the metal disk, may also be provided.

7 Claims, 4 Drawing Sheets

MASTER INFORMATION CARRIER FOR MAGNETIC TRANSFER AND ITS PRODUCTION METHOD

This is a divisional of application Ser. No. 10/791,384 filed Mar. 3, 2004 now abandoned.

BACKGROUND OF THE INVENTION

1. Field of the Invention

The present invention relates to a master information carrier for magnetic transfer, which is used in a magnetic transfer method for magnetically transferring information from the master information carrier, which carries the information to be transferred, to a slave medium, to which the information is transferred, and a method for producing the master information carrier for magnetic transfer 2. Description of the Related Art In magnetic transfer, which is the subject of the present invention, a master information carrier (patterned master) has a magnetic layer at least as a surface layer. A transfer pattern such as a servo signal is formed in embossed shapes on the master information carrier. A magnetization pattern signal corresponding to the information carried by the master information carrier is transferred to and recorded on the slave medium by applying a magnetic field for transfer while the master information carrier is in close contact with the slave medium having a magnetic recording section.

In the case that the above-mentioned slave medium is a disk-shaped medium such as a hard disk or a high-density flexible disk, the aforementioned master information carrier is also disk-shaped and has a transfer pattern of concentric circles. A magnetic field for transfer is applied by arranging a magnetic field applying device such as an electromagnetic device or a permanent magnetic device at one or both sides of the master information carrier while the master information carrier is in close contact with a side or both sides of the slave medium.

As an example of the master information carrier used in the above-mentioned magnetic transfer, a master information carrier, wherein an embossed pattern corresponding to an information signal is formed on a surface of a substrate and a surface of the embossed pattern is coated with a thin magnetic layer, has been proposed (refer to U.S. Patent Laid-Open No. 20010028964, for example).

The master information carrier, which is the subject of the present invention, is produced through the following steps, for example. First, an original disk which has an embossed pattern made of a resist is obtained by coating a Si substrate with an electron beam resist or a photoresist. Then, a transfer pattern is drawn by exposing the electron beam resist or the photoresist to an electron beam, laser beam or the like after baking the electron beam resist or the photoresist. Thereafter, the electron beam resist or the photoresist is developed. Next, a conductive layer is applied on the embossed pattern on the original disk by sputtering, for example. Further, a metal disk (Ni electroforming layer) with a predetermined thickness is laminated on the conductive layer by electroforming Ni. Then, a master substrate (replica) is produced by peeling off the metal disk from the original disk and forming a disk in a predetermined size from the metal disk by die-cutting. Alternatively, the master substrate (replica) may be produced by using a master substrate before die-cutting as the original disk, carrying out electroforming repeatedly, peeling off a metal disk and forming a disk in a predetermined size from the metal disk by die-cutting. Then, a magnetic layer is deposited on a surface of the embossed pattern on the master substrate, and the master information carrier which has the embossed pattern formed on the magnetic layer is produced.

In the magnetic transfer using the above-mentioned master information carrier, a magnetic signal corresponding to the transfer pattern is transferred to and recorded on the slave medium by placing the master information carrier and the slave medium, such as a hard disk or a flexible disk, in close contact with each other and applying an external magnetic field for magnetic transfer.

The above-mentioned technique for producing a stamper by electroforming Ni is widely used in manufacturing optical disks or the like. Generally, disk substrates made of resin are produced from master substrates (stampers) by using an injection molding machine in manufacturing the optical disks. Therefore, some distortion (deformation) of the master substrate is removed by applying pressure at the time of injection molding. On the other hand, in the magnetic transfer, intervals of the embossed pattern are finer than those of the optical disks. A formation unit of the pattern in the magnetic transfer is 300 nm or less and as low as 50 nm or less, for example. Therefore, high accuracy is required.

It is essential that the master information carrier is in close contact with the slave medium evenly without any space between them to realize high-quality signal transfer in the above-mentioned magnetic transfer. Therefore, a contact pressure is increased or air is discharged by vacuum suction so that an air bubble is not formed on the contact surfaces that face each other.

However, if the contact pressure is increased, the pattern on the master information carrier may be destroyed or deformed and the durability properties of the master information carrier may be reduced. Therefore, it is impossible to increase the contact pressure to an extremely high level in the master information carrier. Since the master information carrier is expensive, high durability properties are required.

In the aforementioned master information carrier, wherein the master substrate includes the Si substrate, the amount of warp and distortion is small. However, the step of forming the pattern made of a magnetic material on the Si substrate is complex and time consuming. Further, there is a problem that the cost is high. On the other hand, in production of the master information carrier, wherein the master substrate is produced from the original disk by electroforming Ni or the like, and the master substrates are replicated from the produced master substrate, the master information carriers can be easily produced. Further, since a plurality of master substrates may be replicated from a single original disk, there is a cost advantage and it is practical.

However, in the above-mentioned master information carrier including the master substrate which has been produced by laminating and peeling off the metal disk using the original disk, the surface of the master substrate is not always even. The master substrate is deformed in the step of peeling off the metal disk from the original disk, the step of forming the disk in the predetermined size by die-cutting, etc. Consequently, the master substrate is warped or distorted.

If the master substrate, i.e., master information carrier, is warped or distorted, the contact properties of the master information carrier with the slave medium decreases, which causes spacing between the master information carrier and the slave medium. Particularly, since bit intervals are 300 nm or less, the amount of the above-mentioned spacing highly affects the transfer properties. Additionally, the surface properties of the master information carrier and the slave medium, the thickness of a protective layer which covers the magnetic layer, to improve the durability or the like, also affect the transfer properties. Therefore, it is basically important to reduce the warp and distortion of the master information carrier.

A temperature of solution at the time of electroforming, a method for changing electric currents to be applied, solution concentration, etc. affect deformation of the master information carrier which has been produced by electroforming Ni. However, these effects can be reduced by managing the production process. On the other hand, it is difficult to automate the step of peeling off the metal disk on the original disk, formed by electroforming and the accuracy is higher when the metal disk is manually peeled off. However, the metal disk which will become the master substrate tends to be distorted or deformed by the forces acting on the metal disk when the metal disk is peeled off.

Generally, there is thickness distribution in an electroformed product. The thickness varies in an area around an edge and the thickness distribution is relatively stable around a center. The thickness distribution also varies according to conditions such as the distance between a positive pole and a negative pole of an electroforming device, the design of a device, such as a parallel degree, the temperature of solution, density of electric currents and the type of solution.

Normally, a stamper for optical disk functions without any problem when the accuracy is approximately ±1 μ. However, since the master information carrier for magnetic transfer is required to be closely contacted with the slave medium, the master information carrier is required to be produced accurately so that a more even thickness is realized.

SUMMARY OF THE INVENTION

In view of the foregoing circumstances, it is an object of the present invention to provide a master information carrier for magnetic transfer with high transfer properties by reducing deformation of a metal disk, which is caused at the time of peeling off the metal disk laminated on an original disk, producing the master information carrier using a more even master substrate and improving contact properties with a slave medium. It is also the object of the present invention to provide a method for producing the master information carrier for magnetic transfer.

Further, it is the object of the present invention to provide a method for producing a master information carrier for magnetic transfer with high transfer properties by reducing deformation (distortion/warp) of the metal disk, which is caused at the time of peeling off the metal disk laminated on the original disk, producing the master information carrier using the flatter master substrate and improving the contact properties with the slave medium.

A master information carrier for magnetic transfer according to the present invention has a master substrate made of metal. The master substrate has an embossed pattern corresponding to information to be transferred on its surface and a magnetic layer deposited on the embossed pattern. The master substrate is produced by laminating metal with a predetermined thickness on an original plate by electroforming, on which an embossed pattern corresponding to information is formed, peeling off a metal disk of which the outer diameter is at least 1.7 times longer than the outer diameter of the master substrate from the original plate and forming a metal disk in a desired size.

It is preferable that the master information carrier for magnetic transfer is produced by electroforming Ni.

Further, a method for producing a master information carrier for magnetic transfer includes the steps of laminating a metal disk with a predetermined thickness on an original disk by electroforming or the like, on which an embossed pattern corresponding to information is formed, peeling off the metal disk from the original disk, forming the metal disk into a master substrate in a predetermined shape and depositing a magnetic layer on an embossed pattern on the master substrate. The master substrate in a desired size is formed from the metal disk by die-cutting, wherein an outer diameter of the metal disk is at least 1.7 times longer than an outer diameter of the master substrate after die-cutting.

The original disk may be a metal original disk produced by electroforming metal on an embossed pattern formed by exposing a resist and drawing a pattern on the resist and peeling off a metal mold after the metal mold has been obtained.

It is preferable that the outer diameter of the original disk and the outer diameter of the metal disk are substantially the same. It is preferable that the metal disk is laminated by electroforming Ni.

Further, it is particularly preferable that the outer diameter of the metal disk is at least 1.9 times longer than the outer diameter of the master substrate after die-cutting.

Another method for producing a master information carrier for magnetic transfer according to the present invention includes the steps of laminating a metal disk with a predetermined thickness on an original disk by electroforming or the like, on which an embossed pattern corresponding to information is formed, peeling off the metal disk from the original disk, forming the metal disk into a master substrate in a predetermined shape and depositing a magnetic layer on an embossed pattern on the master substrate. After the metal disk has been peeled off from the original disk, a step of removing distortion of the master substrate to recover deformation of the metal disk is further provided.

It is preferable that the metal disk is formed by electroforming Ni and the step of removing distortion is a step of carrying out heat treatment on the metal disk or the master substrate in an atmosphere at 200-300° C. for 30 minutes to 2 hours.

It is also preferable that the metal disk is formed by electroforming Ni and the step of removing distortion is a step of carrying out heat treatment on the metal disk or the master substrate in atmosphere at 200-300° C. for 30 minutes to 2 hours while the metal disk or the mask substrate is sandwiched by flat plates and fixed by applying pressure at 49-196 kPa.

It is preferable that the step of forming the metal disk into the master substrate in the predetermined shape is the step of die-cutting and the step of removing distortion is provided after the step of die-cutting.

The original disk may be a metal original disk produced by electroforming metal on an embossed pattern formed by exposing a resist, drawing a pattern on the resist, and peeling off a metal mold after the metal mold has been obtained.

The aforementioned step of removing distortion may be provided after the step of peeling off so that distortion due to deformation caused in the step of peeling off is removed. Alternatively, the aforementioned step of removing distortion may be provided once after the step of die-cutting so that distortion due to deformation caused in the step of peeling off from the original disk and deformation caused in the step of die-cutting are removed at once. Alternatively, the aforementioned step of removing distortion may be provided respectively after the step of peeling off and after the step of die-cutting so that distortion due to deformation in each of the steps is removed independently.

According to the present invention as described above, the master substrate is produced by laminating a metal disk of which the outer diameter is at least 1.7 times longer than the outer diameter of the master substrate after processing on an original plate, on which an embossed pattern corresponding to information is formed, by electroforming or the like, peeling off the metal disk from the original disk and forming the master substrate in a desired size. Therefore, in the case that the metal disk is peeled off from the original disk, an outer circumference portion of the metal disk is wider than a portion within an outer diameter of the area where the transfer pattern is formed. Accordingly, the forces come to act evenly on the portion where the transfer pattern is formed, as the forces act on the outer circumference portion at the time of peeling off. Hence, deformation at the time of peeling off is reduced and the flatness of the master substrate is ensured. Further, the electromagnetic conversion properties (signal qualities) are improved. Particularly, the deviation of signals (modulations) within a track can be improved.

Further, the master substrate is formed by using a portion around the center of the metal disk. Since the master substrate is produced using the portion with the even thickness in the thickness distribution of the metal disk, formed at the time of electroforming, the flatness of the master substrate can be ensured. Consequently, the transfer qualities are improved and the reliability can be ensured.

Further, in the other method for producing the master information carrier for magnetic transfer according to the present invention as mentioned above, a metal disk is laminated on an original disk by electroforming or the like, on which an embossed pattern corresponding to information is formed and the metal disk is peeled off from the original disk. Then, the metal disk is formed into a master substrate in a predetermined shape. The step of removing distortion to recover deformation of the metal disk is further provided after the metal disk has been peeled off from the original disk. Therefore, deformation of the metal disk, caused at the time of peeling off the metal disk laminated on the original disk by electroforming or the like and deformation caused at the time of forming the metal disk into a desired size may be corrected in the step of removing distortion. Hence, the flatness of the master substrate is ensured and the electromagnetic conversion properties (signal qualities) are improved. Particularly, the deviation of signals (modulations) within a track can be improved.

Particularly, if the heat treatment is carried out while the metal disk or the master substrate is sandwiched between flat plates and fixed by applying pressure, distortion can be efficiently removed and the flatness of the metal disk and the master substrate can be ensured.

DESCRIPTION OF THE PREFERRED EMBODIMENTS

Figure 1:
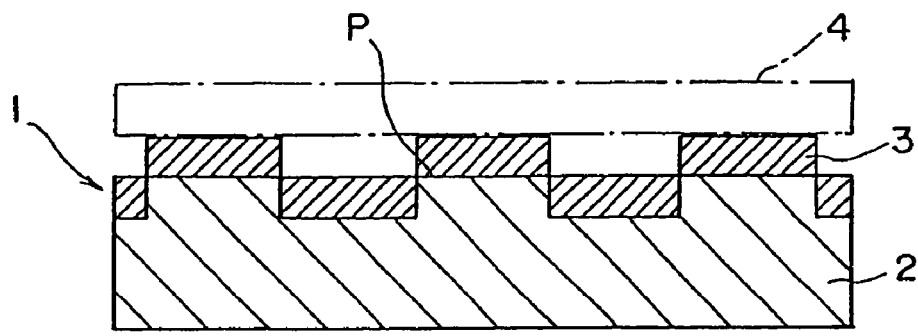
FIG. 1 shows a partial cross-sectional view illustrating the schematic construction of a master information carrier for magnetic transfer according to an embodiment of the present invention.
Figure 2A:
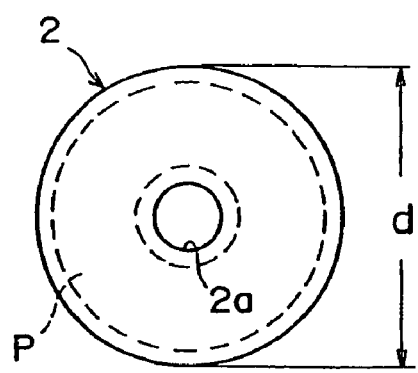
FIG. 2A shows a plan view illustrating a master substrate.
Figure 2B:
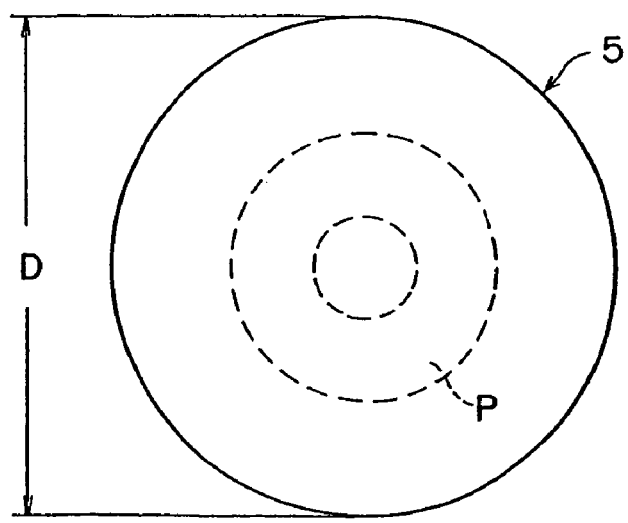
FIG. 2B shows a plan view illustrating a metal disk before die-cutting.

Hereinafter, embodiments of the present invention will be described in detail with reference to the attached drawings. FIG. 1 shows a partial cross-sectional view of a master information carrier for magnetic transfer according to an embodiment of the present invention. FIG. 2A shows a plan view of a master substrate. FIG. 2B shows a plan view of a metal disk before die-cutting. FIGS. 3A-3E sequentially show the steps of producing the master substrate according to the embodiment. Each of the figures is a schematic view and dimensions are shown at different ratios than those of the actual sizes.

A master information carrier 1 for magnetic transfer, illustrated in FIG. 1, includes a master substrate 2 made of metal and a magnetic layer 3. The master substrate 2 has a fine embossed pattern P (transfer pattern) on its surface, corresponding to information to be transferred and the surface is coated with the magnetic layer 3.

The aforementioned master substrate 2 is produced by electroforming Ni, for example. As illustrated in FIG. 2A, the master substrate 2 has a center hole 2a and is in the shape of a disk with an outer diameter d. The embossed pattern P is formed in a ring-shaped area on a side (information carrying surface) of the master substrate 2, excluding an inner circumference area and an outer circumference area. The master substrate 2 is produced by laminating a metal disk 5 as illustrated in FIG. 2B on an original disk (which will be described later) by electroforming or the like, peeling off the metal disk 5 and forming the master substrate 2 in a predetermined shape with the above-mentioned outer diameter d and the center hole 2a by die-cutting. The above-mentioned metal disk 5 is formed so that an outer diameter D of the metal disk 5 is at least 1.7 times longer than the outer diameter of the master substrate 2. Specifically, the metal disk 5 is formed so that the relationship of D≧1.7 d is satisfied. It is preferable that the outer diameter D is at least 1.9 times longer than the outer diameter d.

At the time of magnetically transferring information, a surface (embossed pattern) of the magnetic layer 3 of the aforementioned master information carrier 1 and a slave medium 4, to which the information is transferred, shown by dash-dotted lines, are placed in close contact with each other and a magnetic field for transfer is applied as illustrated in FIG. 1. The slave medium 4 has been initially-magnetized either in an in-plane direction or in a perpendicular direction in advance. The magnetic field for transfer is applied in the in-plane direction or the perpendicular direction, in substantially the opposite direction from the magnetic field applied in the initial-magnetization.

The magnetic field for transfer applied at the time of magnetic transfer is absorbed in the protrusions of the embossed pattern on the magnetic layer 3 of the master information carrier 1, which are in close contact with the slave medium 4. In the case of in-plane recording, the initial-magnetization in these areas is not reversed and the initial-magnetization in the other areas is reversed. In the case of perpendicular recording, the initial-magnetization in these areas is reversed and the initial-magnetization in the other areas is not reversed. Consequently, a magnetization pattern corresponding to the embossed pattern on the master information carrier 1 is transferred to and recorded on a magnetic recording layer of the slave medium 4. The height of the protrusions in the embossed pattern on the magnetic layer 3 should be 20-600 nm and preferably in a range of 30-300 nm.

The above-mentioned master information carrier 1 can also transfer a magnetization pattern to the slave medium 4 and record the magnetization pattern on the slave medium by changing the direction of the initial-magnetization for the slave medium 4 and the application direction of the magnetic field for transfer to the opposite directions even if the embossed pattern on the magnetic layer 3 is a negative pattern which has an inverse embossed patter to the positive pattern.

As will be described later in detail, the master substrate 2 of the above-mentioned master information carrier 1 is produced by laminating the metal disk 5 having the outer diameter D with a predetermined thickness on an original disk (of which outer diameter is substantially same as the outer diameter D of the metal disk 5), on which an embossed pattern corresponding to information is formed, by electroforming Ni, peeling off the metal disk 5 from the original disk and producing the master substrate in a desired size with the outer diameter d and the center hole 2a. In the case that the metal disk 5 is peeled off from the original disk, the outer diameter D of the metal disk 5 is at least 1.7 times longer than the outer diameter d of the aforementioned master substrate 2. Specifically, the outer circumference portion is enlarged from the outer diameter of the area where the transfer pattern P is formed. Accordingly, since the forces act on the outer circumference portion at the time of peeling off the metal disk 5 from the original disk, the influence on the portion where the transfer pattern is formed is reduced. Hence, deformation of the metal disk 5 is reduced and the flatness of the master substrate is ensured. Further, the electromagnetic conversion properties (signal qualities) are improved. Particularly, the deviation of signals (modulations) within a track can be improved.

A method for producing the master substrate 2 in an embodiment will be described with reference to FIGS. 3A-3E.

Figure 3A:
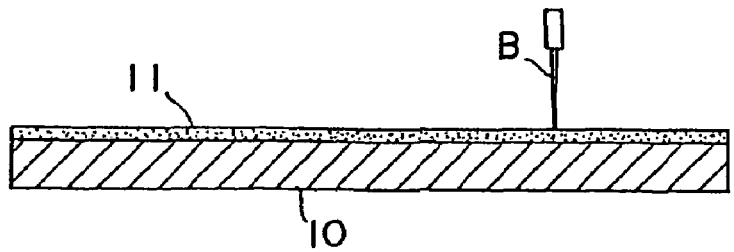
FIG. 3A shows the step of producing the master substrate according to an embodiment.
Figure 3B:
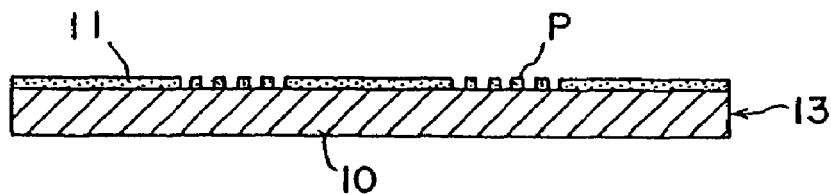
FIG. 3B shows the step of producing the master substrate according to an embodiment.

First, pretreatment such as forming a close contact layer on an original plate 10 which is made of a silicon wafer (which may also be a glass plate or quartz plate) and has a clean smooth surface, is carried out as illustrated in FIG. 3A. The outer diameter of the original plate 10 is at least 1.7 times longer than the outer diameter d of the master substrate 2. A resist coating 11 is formed by applying an electron beam resist solution by spin coating or the like and baked. Then, the original plate 10 is irradiated with an electron beam B, which has been modulated according to the servo signal or the like, in an electron beam exposure device which is not illustrated. The electric beam exposure device has a highly accurate rotation stage. A desired pattern is drawn on the resist coating 11 by exposing the resist coating 11 while the original plate 10 is mounted on the rotation stage and turned. After then, the resist coating 11 is developed and an exposed portion is removed. Consequently, an embossed pattern P with a desired thickness is formed by the remaining resist coating 11 as illustrated in FIG. 3B. An original disk 13 which allows electroforming on its surface is produced by applying a Ni conductive coating, which is not illustrated, on the embossed pattern P.

Figure 3C:
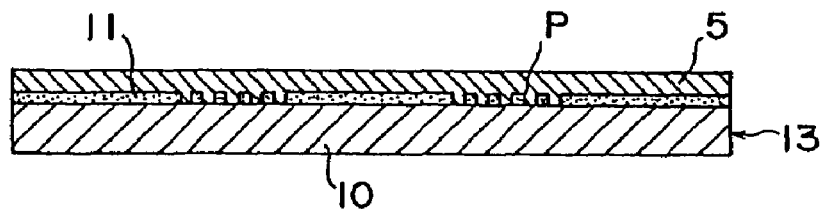
FIG. 3C shows the step of producing the master substrate according to an embodiment.
Figure 3D:
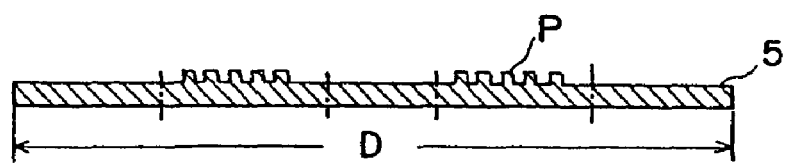
FIG. 3D shows the step of producing the master substrate according to an embodiment.

Next, the metal disk 5 (electroforming layer) made of Ni metal with a desired thickness is laminated on an entire surface of the original disk 13 by electroforming in an electroforming device as illustrated in FIG. 3C. The metal disk 5 is peeled off from the above-mentioned original disk 13 and the remaining resist coating 11 is removed and cleaned. Consequently, the metal disk 5 with an inverse embossed pattern P is obtained as illustrated in FIG. 3D. The outer diameter D of the metal disk 5 is slightly shorter as an outer edge is used as a point of contact for electrodes. The outer diameter D corresponds to an outer diameter of the original disk 13 and the outer diameter D is at least 1.7 times longer than the outer diameter d of the master substrate 2 as already mentioned. The above-mentioned electroforming is carried out in an optimal condition without distorting the laminated electroforming layer by controlling solution concentration, pH, the manner of applying the electric current, the temperature of solution and the like.

Figure 3E:
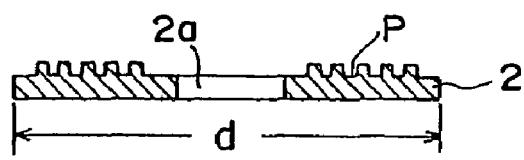
FIG. 3E shows the step of producing the master substrate according to an embodiment.

Then, the master substrate 2 is obtained by forming the master substrate 2 in a predetermined size from the above-mentioned metal disk 5 by die-cutting at outer and inner circumferences as illustrated in FIG. 3E. The master substrate 2 has the center hole 2a and the outer diameter d as illustrated in FIG. 2A.

After the aforementioned step, even though this step is not illustrated, the master information carrier 1 is produced by depositing the magnetic layer 3 on a surface of the embossed pattern P of the above-mentioned master substrate 2 by sputtering. If necessary, a protective layer is also deposited.

As another step in the production process, the master substrate may be produced by producing a second original disk by electroforming metal on the aforementioned original disk 13, electroforming metal using the second original disk, producing a metal disk having an inverse embossed pattern and forming a disk in a predetermined size from the metal disk by die-cutting. The master substrate may also be produced by producing a third original disk by electroforming metal on the second original disk or pressing a resin solution onto the second original disk and curing the resin solution, producing a metal disk by electroforming metal on the third original disk and peeling off the metal disk having an inverse embossed pattern. A plurality of metal disks 5 may be produced by repeatedly using the aforementioned second original disk or third original disk.

In production of the aforementioned original disk 13, the resist coating 11 may be removed after an embossed pattern is formed on the surface of the original plate 10 made of a wafer by etching after the resist coating 11 is exposed and developed. The original disk 13 having the embossed pattern may be produced by electroforming metal as in FIG. 3C after a Ni conductive layer is formed on the embossed pattern.

In FIGS. 3A-3E, back sides of the original disk 13 and the metal disk 5 formed by electroforming are flat. However, even if an embossment reflecting the embossed pattern formed on the front sides is formed on the back sides, the master information carrier 1 can be produced without any problem. If required, the back sides may be flattened by polishing.

Figure 4A:
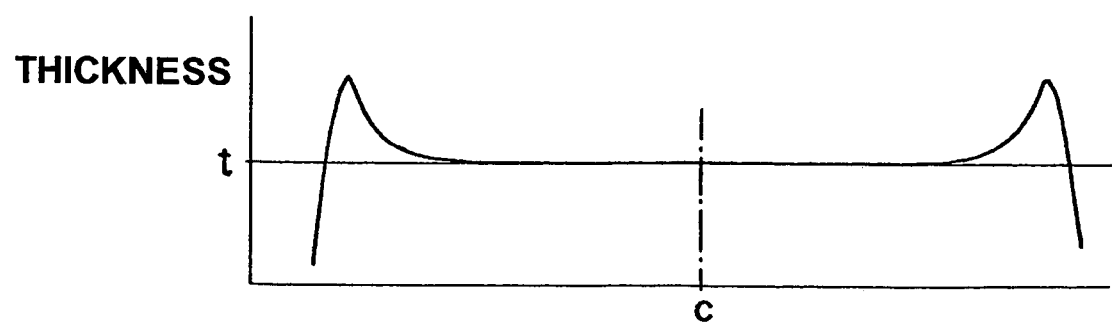
FIG. 4A shows a graph of thickness distribution of the metal disk after electroforming, measured in a diameter direction.
Figure 4B:
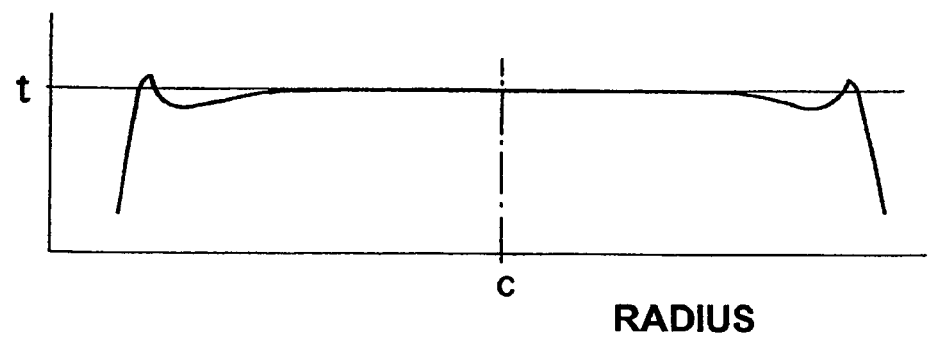
FIG. 4B shows a graph of thickness distribution of the metal disk after electroforming, measured in the diameter direction.

FIGS. 4A and 4B show two measurement examples (a) and (b) of thickness distribution in a diameter direction of the aforementioned metal disk 5. The horizontal axes show points on radiuses from a center c, and the vertical axes show thickness distribution with respect to a predetermined thickness t.

In depositing metal by electroforming, the thickness varies around the outer circumference in the diameter direction and the thickness varies only a little or the thickness is even around the center in both measurement examples (a) and (b). A flat, even electroforming layer is obtained around the center. The flatter master substrate 2 can be obtained by removing an outer circumference portion of the metal disk 5 by die-cutting and producing the master substrate 2 using the portion with an even thickness (without variation in thickness) of the metal disk 5.

The thickness distribution in the above-mentioned magnetic layer also varies according to the distance between a positive pole and a negative pole in an electroforming device, the design of a device, such as a parallel degree, the temperature of solution, density of electric current, the type of solution, etc.

The aforementioned magnetic layer 3 is formed by depositing a magnetic material by vapor deposition methods such as a vacuum evaporation method, a sputtering method, an ion plating method or the like and plating methods such as electroforming. Co, Co alloy (CoNi, CoNiZr, CoNbTaZr, etc.), Fe, Fe alloy (FeCo, FeCoNi, FeNiMo, FeAlSi, FeAl, FeTaN), Ni and Ni alloy (NiFe) may be used as the magnetic material for the magnetic layer 3. FeCo and FeCoNi are particularly preferable. The thickness of the magnetic layer 3 should be 50 nm-500 nm and preferably 100 nm-400 nm.

It is preferable to apply a protective coating made of diamond-like carbon (DLC) or the like on the embossed pattern on the magnetic layer 3. A lubricant layer may also be formed. Further, it is preferable that there are a DLC coating with the thickness of 5-30 nm and the lubricant layer as the protective coatings. The lubricant can improve the durability, by preventing generation of scratches due to friction when positional misalignments during contact with the slave medium 4, is corrected and the like.

A disk-shaped magnetic recording medium such as a hard disk or a high-density flexible disk, on one or both sides of which magnetic layers are formed, is used as the slave medium 4. A magnetic recording section includes either a coated magnetic recording layer or a magnetic recording layer made of a thin metal film. Co, Co alloy (CoPtCr, CoCr, CoPtCrTa, CoPtCrNbTa, CoCrB, CoNi, etc.), Fe, Fe alloy (FeCo, FePt, FeCoNi) may be used as the magnetic material for the magnetic recording layer made of the thin metal coating. It is preferable that the density of the magnetic flux is large and the magnetic material has the magnetic anisotropy in the same direction (an in-plane direction for in-plane recording and a perpendicular direction for perpendicular recording) as that in which the magnetic field is applied, so that the information is transferred clearly. Further, it is preferable to provide a non-magnetic backing layer below the magnetic material (on the side of a supporting body) to realize the required magnetic anisotropy. It is also required that the crystal structure and the lattice constant of the magnetic material are matched with those of the magnetic layer. Therefore, Cr, CrTi, CoCr, CrTa, CrMo, NiAl, Ru, etc. are use-d.

In a magnetic field application means for applying the initial magnetic field and a magnetic field for transfer, in the case of in-plane recording, a ring-type electromagnetic device is arranged at both above and below of the slave medium 4, for example. Coils are wrapped around a core of the ring-type electromagnetic device and the core has a gap extending toward a radial direction of the slave medium 4. The magnetic field for transfer is generated and applied in the same direction, which is parallel to a track direction, both above and below the slave medium 4. At the time of applying the magnetic field, the magnetic field for transfer is applied by the magnetic field application means while a contacted body of the slave medium 4 and the master information carrier 1 is rotated. It is also possible for the magnetic field application means to be rotated. The magnetic field application means may also be provided only at one side of the slave medium 4. Permanent magnetic devices may be provided either at both sides or at one side of the slave medium 4.

In the case of perpendicular recording, electromagnets or permanent magnets which have different magnetic polarities are arranged above and below the contacted body of the slave medium 4 and the master information carrier 1, and the magnetic field is generated and applied in the perpendicular direction. In the case of partially applying the magnetic field, either the contacted body of the slave medium 4 and the master information carrier 1 or the magnetic field is moved and information on an entire surface is magnetically transferred.

In the master substrate 2 which has been produced in the above-mentioned production method, in the case that the metal disk 5 is peeled off from the original disk 13, the outer diameter D of the metal disk 5 is at least 1.7 times longer than the outer diameter d of the master substrate 2. Consequently, the outer circumference portion is wider than the outer diameter of the area where the transfer pattern P is formed. Since the forces act on the outer circumference portion at the time of peeling off, the forces act evenly on the portion where the transfer pattern P is formed. Hence, deformation at the time of peeling off is reduced and the flatness of the master substrate is ensured. Further, the electromagnetic conversion properties (signal qualities) are improved. Particularly, the deviation of signals (modulations) within a track can be improved.

Next, evaluation results of magnetic transfer using the master information carrier according to the present embodiment will be described. In the experiments, master substrates as in examples 1-4 and comparative examples 1-5 were produced by varying the outer diameter D of the electroformed metal disk 5 before die-cutting and the outer diameter d of the master substrate 2 after die-cutting as shown in TABLE 1. Surface runout amounts (distortion amounts) of the master substrates were measured. Modulations in information, when the information was magnetically transferred from the master information carrier using the master substrates were measured and evaluated.

The steps of producing the master substrates as in examples 1-4 and comparative examples 1-5 were sequentially performed as follows: Si Wafer→pre-treating→applying electron beam resist→baking→drawing by electron beam→baking→developing→applying conductive layer→electroforming→peeling off→removing resist→die-cutting. Further, when the master information carriers were produced, the following steps were performed using the above-mentioned master substrate: oxygen ashing (oxidation treatment)→depositing magnetic layer→depositing DLC protective coating.

A Si wafer with an flatness level (TTV value: Total Thickness Variation) of 10 μm or less was used as the above-mentioned Si wafer. The flatness level (TTV value) is a difference between the maximum value and the minimum value of the thickness of the Si wafer which was suctioned and fixed. If a Si wafer with a large flatness level value is used, the original shape is distorted and the flatness level of the master substrate after electroforming may not be ensured.

In measuring the surface runout amounts, the master substrate were fixed to a spindle motor at a position with an inner diameter of 25 mm and rotated at 10 rpm. In this condition, the displacement amounts were measured perpendicularly to the surface at the position of radius r=30 mm by using a laser displacement sensor (produced by KEYENCE corporation: LC-2430 displacement sensor) and displacement waveforms were captured by a digital oscilloscope. The differences between the maximum values and the minimum values at this time were used as the surface runout amounts (excluding a primary component caused by chucking). Further, a frequency analysis (FFT conversion) of the captured data for a track was carried out and frequency components were calculated. A level of a secondary frequency component was defined as level 1 in the case that the displacement amount of the secondary component alone is 100 μm or more. If a level of the tertiary or higher components exceeded 0.2 at a peak position of each frequency, it was judged that each component was included. The frequency components are shown in TABLE 1.

Modulation is deviation of outputs in the case that a signal in a preamble (AGC) in each sector in a servo signal is magnetically transferred to the slave medium and read by a head. With a maximum signal amplitude a and a minimum signal amplitude b, the modulation (Mod.) is represented as $\{(a-b)/(a+b)\} \times 100[\%]$, for example. In the above-mentioned experiments, Guzik1601 and a tester of Kyodo Denshi System Co., Ltd. were used in testing the modulation.

deformation of the edge, caused at the time of peeling of the metal disk substantially remained in the master substrate.

In the above-mentioned surface runout amount (distortion), even if a distortion amount is large, there are cases in which distortion is recovered and good contact is realized depending on a ratio of the frequency component (order) at the time when the master information carrier and the slave medium contact each other. When the metal disk is peeled from the original disk from one direction for example, there is a possibility that the component exceeding the secondary component can be reduced. If distortion exceeding the secondary component is large, there is a tendency that the spacing occurs even if the contact pressure is increased, which is not desirable. On the contrary, if the component does not exceed the secondary component, distortion is manageable by increasing the contact pressure within an allowable range.

Among the distortion components, the primary component is a displacement component when the disk is simply inclined. The primary component is a change including a single increase and a single decrease in height during one rotation. The secondary or higher components are displacements showing the unevenness within one rotation. The secondary component is distortion including increases in height at two points during one rotation. The third component is distortion including increases in height at three points during one rotation. Similarly, the fourth or higher component is distortion including increases in height at four or more points, which shows the unevenness during one rotation. In actual

TABLE 1

| | Outer Diameter D mm | Outer Diameter d mm | D/d | Surface Runout Amount μm | Frequency Component | Mod. Value % |
|---|---|---|---|---|---|---|
| Example 1 | 150 | 67 | 2.24 | 32 | Secondary | 4.9 |
| Example 2 | 193 | 97 | 1.99 | 41 | Secondary | 3.8 |
| Example 3 | 185 | 97 | 1.91 | 53 | Secondary | 4.8 |
| Example 4 | 204 | 120 | 1.70 | 95 | Secondary | 5.8 |
| Comparative Example 1 | 193 | 120 | 1.61 | 130 | Secondary, Third | 13 |
| Comparative Example 2 | 185 | 120 | 1.54 | 312 | Secondary, Third | 18 |
| Comparative Example 3 | 150 | 97 | 1.55 | 315 | Secondary, Third | 16 |
| Comparative Example 4 | 100 | 67 | 1.49 | 290 | Secondary, Third, Fifth, Seventh | 45 |
| Comparative Example 5 | 100 | 97 | 1.03 | 350 | Secondary, Third Fifth | 21 |

The evaluation results described above show that the surface runout amounts (distortion amounts) of the master information carriers as in examples 1-4 according to the present invention were 100 μm or less per a track at the same radius. The deviation (deviation of signal amplitude strength: modulation) of signal outputs per a track of the slave medium to which the information was transferred was 6% or less. Therefore, high quality transfer, which does not influence the servo following performance, for example, becomes possible.

On the other hand, in the comparative examples, when the electroformed metal disks were peeled off from the original disks, the influence of deformation was large and the surface runout amounts were large. Hence, the contact properties decreased and the modulation increased. Further, the signal qualities dropped. Particularly, in comparative example 5, cases, distortion occurs due to the primary component and the secondary component overlapping, and being simultaneously generated. A plurality of distortion components are simultaneously generated, which becomes a total distortion amount. The distortion amount is defined by the difference between the highest position and the lowest position in the displacement during one rotation and the distortion amount can be obtained separately for each component.

The warp is deformation wherein the height differs between the inner circumference portion and the outer circumference portion even if there is no distortion within a track. Deformation to a spherical surface is an example of the warp. The difference between the highest position and the lowest position is defined as the warp amount.

Figure 5A:
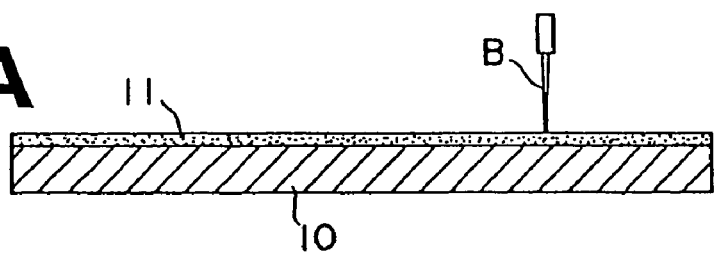
FIG. 5A shows the step of producing the master substrate according to another embodiment.
Figure 5B:
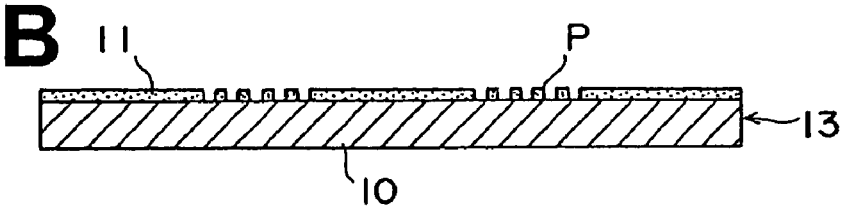
FIG. 5B shows the step of producing the master substrate according to the other embodiment.
Figure 5C:
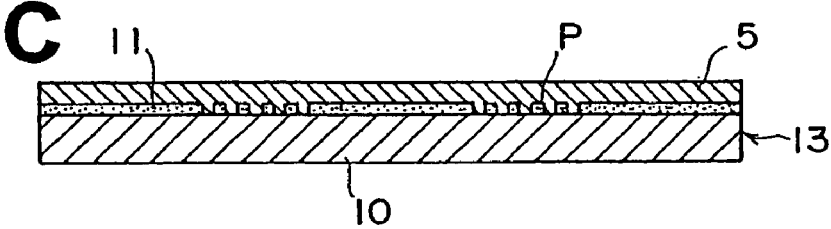
FIG. 5C shows the step of producing the master substrate according to the other embodiment.
Figure 5D:
FIG. 5D shows the step of producing the master substrate according to the other embodiment.
Figure 5E:
FIG. 5E shows the step of producing the master substrate according to the other embodiment.
Figure 5F:
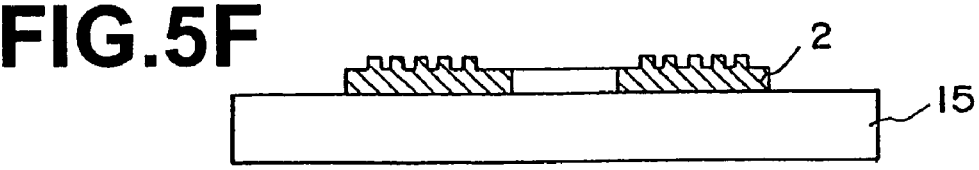
FIG. 5F shows the step of producing the master substrate according to the other embodiment.

A method for producing the master information carrier according to another embodiment of the present invention will be described with reference to FIGS. 5A-5F. The steps in FIGS. 5A-5E are same as the steps in FIGS. 3A-3E and the step illustrated in FIG. 5F is added. Detailed description on the same steps is omitted.

In the present embodiment, the processing for removing distortion, such as heat treatment of the metal disk (particularly, the metal disk (master substrate) after die-cutting) is carried out by annealing after the metal disk is peeled off from the original disk. Consequently, deformation of the metal disk is reduced and the flatness of the master substrate is ensured. Further, the electromagnetic conversion properties (signal qualities) are improved. The deviation of signals (modulations) within a track is particularly improved.

First, in steps illustrated in FIGS. 5A-5E, the original disk 13 which has the embossed pattern P is produced. The embossed pattern P is formed by forming the resist coating 11 on the original plate 10 made of a silicon wafer and drawing a desired pattern by exposing the resist and developing. The metal disk 5 which has the inverse embossed pattern is obtained by laminating the metal disk 5 on the original disk 13 by electroforming Ni metal on the original disk 13 and peeling off the metal disk 5 from the original disk 13. After then, the master substrate 2 is produced by forming the master substrate 2 in a predetermined size from the above-mentioned metal disk 5 by die-cutting at outer and inner circumferences.

Next, deformation (distortion/warp) of the above-mentioned master substrate 2 caused at the time when the aforementioned metal disk 5 was peeled off from the original disk 13 and the time of die-cutting is corrected in the step of removing distortion. Consequently, the master substrate 2 becomes even as illustrated in FIG. 5F. Specifically, the step of removing distortion is the step of annealing by mounting the master substrate 2 on a flat surface plate 15 in an electric furnace and carrying out heat treatment for 30 minutes to 2 hours in an atmosphere of 200-300° C. (250° C.×1 hour, for example) while the master substrate 2 is placed on the flat surface, so that internal distortion is removed and deformation is corrected. When the temperature is lower than 200° C., distortion is not removed sufficiently. When the temperature exceeds 300° C., the master substrate 2 becomes fragile.

Figure 6:
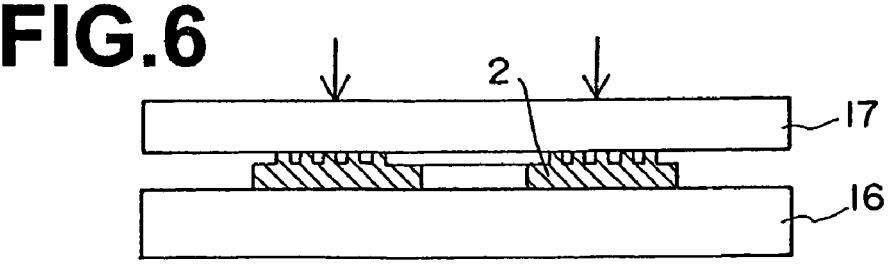
FIG. 6 shows another embodiment of the step of removing distortion.

FIG. 6 shows another embodiment of the above-mentioned step of removing distortion. The step illustrated in FIG. 5F is substituted with the step illustrated in FIG. 6. In the step of removing distortion in this embodiment, while the master substrate 2 after die-cutting is sandwiched by two flat surface plates 16 and 17 in atmosphere at 200-300° C. in the electric furnace and fixed by being pressured at 49-196 kPa, heat treatment is carried out for 30 minutes to 2 hours (250° C.×1 hour, for example) as in the aforementioned example. The internal distortion is removed and the master substrate 2 is annealed to recover deformation.

The warp and distortion of the flat surface plates 15, 16 and 17 which are used in the aforementioned steps of removing distortion should be 1 μm or less and a glass plate, a processed metal plate or the like may be used as the flat surface plates 15, 16 and 17.

Further, the above-mentioned step of removing distortion may be performed using the metal disk 5 before die-cutting. Additionally, the step of removing distortion may be performed also after die-cutting.

After the aforementioned steps, the master information carrier 1 is produced by depositing the magnetic layer 3 on a surface of the embossed pattern P of the above-mentioned master substrate 2 by sputtering. If necessary, a protective layer is also deposited.

In the master substrate 2 produced as mentioned above, deformation caused at the time of peeling off the metal disk 5 laminated on the original disk 13 by electroforming or the like and deformation caused at the time of forming the disk in a desired size by die-cutting are corrected by removing distortion in the step of removing distortion after the step of die-cutting. Consequently, the flatness of the master substrate 2 is ensured and the contact properties of the master information carrier 1 using the master substrate 2 with the slave medium 4, at the time of magnetically transferring information, are improved. Hence, the signal can be magnetically transferred in a good condition without deviation of signals.

Next, evaluation results of the magnetic transfer using the master information carriers according to the present embodiment will be described. In the experiments, master substrates as in examples 5-7 and comparative examples 6, 7 were produced by changing conditions of processing for removing distortion (heat treatment) as shown in TABLE 2. Surface runout amounts (distortion amounts) of the master substrates were measured. Modulation when the information was magnetically transferred from the master information carrier using the master substrates was measured and evaluated as in the aforementioned evaluation.

EXAMPLE 5

The steps of producing the master substrate as in example 5 were sequentially performed as follows: Si Wafer with a diameter of 100 mm→pre-treating→applying electron beam resist→baking→drawing by electron beam→baking→developing→applying conductive layer→electroforming→peeling off→removing resist→die-cutting (outer diameter 85 mm, inner diameter 25 mm)→heat treatment on a flat plate (210° C.×100 min.). Further, in the case that the master information carrier was produced, the following steps were performed for the above-mentioned master substrate: oxygen ashing (oxidation treatment)→depositing magnetic layer→depositing DLC protective coating. A Si wafer which has the flatness level (TTV value: Total Thickness Variation) of 10 μm or less was used as the above-mentioned Si wafer.

EXAMPLE 6

The steps of producing the master substrate as in example 6 are same as the above-mentioned example 5 except the condition of the heat treatment. The condition of the heat treatment was 290° C.×40 min.

EXAMPLE 7

In the steps of producing the master substrate as in example 7, the heat treatment for removing distortion was carried out as follows. The master substrate was heated in the condition of 210° C.×100 min. while the master substrate is sandwiched by flat surface plates as illustrated in FIG. 6 and pressured at 98 kPa.

COMPARATIVE EXAMPLES 6 AND 7

The steps of producing the master substrate as in comparative examples 6 and 7 are same as the above-mentioned example 5 except the condition of the heat treatment. The heat treatment was not carried out for comparative example 6. The condition of the heat treatment was 150° C.×40 min. in comparative example 7.

TABLE 2

| | Heat Treatment Condition (temperature × time) | Surface Runout Amount (μm) | Mod. Value (%) |
|---|---|---|---|
| Example 5 | 210° C. × 100 min. (mounted on flat plate) | 45 | 4.3 |
| Example 6 | 290° C. × 40 min. (mounted on flat plate) | 58 | 5.2 |
| Example 7 | 210° C. × 100 min. (sandwiched by flat plates) | 9 | 3.2 |
| Comparative Example 6 | No Heat Treatment | 280 | 21 |
| Comparative Example 7 | 150° C. × 40 min. (mounted on flat plate) | 190 | 18 |

The above-mentioned evaluation result shows that the surface runout amounts (distortion amounts) of the master information carriers as in examples 5-7 according to the present embodiment were 100 μm or less per a track at a same radius. The deviation (deviation of signal amplitude strength: modulation) of signal outputs per a track in the slave medium to which the information was transferred was 6% or less. Therefore, the high quality transfer which does not influence the servo following performance becomes possible, for example. In examples 5 and 6, the master substrates were mounted on the flat plates and heated. The master substrate as in example 5, was produced in a longer processing time and was more even. In example 7, the master substrate was heated while the master substrate was sandwiched and pressured by the flat plates. Therefore, distortion was removed more efficiently than example 5 and the master substrate was more even.

On the other hand, in comparative example 6, the heat treatment as the step of removing distortion was not carried out. Therefore, deformation caused when the electroformed metal disk was peeled off from the original disk was not recovered and the surface runout amount was large. In comparative example 7, the temperature of the heat treatment was low. Therefore, distortion was not removed sufficiently and the surface runout amount was large. In both comparative examples, the contact properties between the master information carrier and the slave medium at the time of magnetic transfer decreased. Therefore, the modulation increased and the signal quality dropped. Further, the frequency components of distortion in the comparative examples included disposition of third or higher frequency components.

What is claimed is:

1. A method for producing a master information carrier for magnetic transfer, comprising the steps of:
    forming a master substrate by laminating a metal disk with a predetermined thickness on an original disk by electroforming, on which an embossed pattern corresponding to information is formed, peeling off the metal disk from the original disk and forming the metal disk into a predetermined shape; and
    depositing a magnetic layer on an embossed pattern on the master substrate, wherein the master substrate is produced by forming a disk in a desired size from the metal disk by die-cutting, wherein an outer diameter of the metal disk is at least 1.7 times longer than an outer diameter of the master substrate after die-cutting.

2. The method for producing a master information carrier for magnetic transfer as defined in claim 1, wherein the original disk is a metal original disk produced by electroforming metal on an embossed pattern formed by exposing a resist and drawing a pattern on the resist and peeling off a metal mold after the metal mold has been obtained.

3. The method for producing a master information carrier for magnetic transfer as defined in claim 1, wherein an outer diameter of the original disk and an outer diameter of the metal disk are substantially the same.

4. The method for producing a master information carrier for magnetic transfer as defined in claim 1, wherein the metal disk is laminated by electroforming Ni.

5. A method for producing a master information carrier for magnetic transfer, comprising the steps of:
    forming a master substrate by laminating a metal disk with a predetermined thickness on an original disk by electroforming, on which an embossed pattern corresponding to information is formed, peeling off the metal disk from the original disk and forming the metal disk into a predetermined shape; and
    depositing a magnetic layer on an embossed pattern on the master substrate, wherein after the metal disk has been peeled off from the original disk, the step of removing distortion of the master substrate to correct deformation of the metal disk is further provided wherein the step of removing distortion is a step of carrying out heat treatment on the metal disk or the mask substrate in atmosphere at 200-300° C. for 30 minutes to 2 hours while the metal disk or the mask substrate is sandwiched by flat plates and fixed by applying pressure at 49-196 kPa.

6. The method for producing a master information carrier for magnetic transfer as defined in claim 5, wherein the step of forming the metal disk into a predetermined shape of the master substrate is a step of die-cutting, wherein the step of removing distortion is provided after the step of die-cutting.

7. The method for producing a master information carrier for magnetic transfer as defined in claim 5, wherein the original disk is a metal original disk produced by electroforming metal on an embossed pattern formed by exposing a resist and drawing a pattern on the resist and peeling off a metal mold after the metal mold has been obtained.

* * * * *